United States Patent [19]

Buholz

[11] Patent Number: 4,513,422
[45] Date of Patent: Apr. 23, 1985

[54] $CO_2$ LASER STABILIZATION AND SWITCHING

[75] Inventor: Neal E. Buholz, Palo Alto, Calif.

[73] Assignee: The United States of America as represented by the Secretary of the Air Force, Washington, D.C.

[21] Appl. No.: 504,353

[22] Filed: Jun. 14, 1983

[51] Int. Cl.³ .............................................. H01S 3/13
[52] U.S. Cl. ...................................... 372/29; 372/38; 372/32; 372/23; 372/24
[58] Field of Search ...................... 372/29, 32, 20, 19, 372/23, 24, 38, 96

[56] References Cited

U.S. PATENT DOCUMENTS

| | | | |
|---|---|---|---|
| 3,395,365 | 7/1968 | Fork | 331/94.5 |
| 3,453,557 | 7/1969 | Polanyi et al. | 331/94.5 |
| 3,458,259 | 7/1969 | Bagley et al. | 356/106 |
| 3,588,738 | 6/1971 | Goodwin | 331/94.5 |
| 4,184,127 | 1/1980 | Green et al. | 331/94.5 |

OTHER PUBLICATIONS

Gillard et al., "Absolute Distance Interferometry", Opt. Eng., vol. 20, No. 1, Jan./Feb. 1981, pp. 129–134.
Buholz; "Selected Five-Color Operation of a $CO_2$ Laser"; Opt. Eng., vol. 20, No. 2, Mar./Apr. 1981, p. 325.
Buholz; "Selected Five Color Operation of a $CO_2$ Laser"; SPIE, vol. 228, p. 78, 1980.
Buholz; "Selected Two-Color Operation of a $CO_2$ Laser"; IEEE J.Q.E., vol. QE-16, No. 8, Aug. 1980.
Buholz, "Five Color $CO_2$ Laser Stabilization and Switching," IEEE Journal of Quantum Electronics, Sep. 1982, vol. QE-18, pp. 1326–1331.

Primary Examiner—William L. Sikes
Assistant Examiner—Léon Scott, Jr.
Attorney, Agent, or Firm—Donald J. Singer; Stanton E. Collier

[57] ABSTRACT

A $CO_2$ laser operating in the 10 μm band is stabilized by a stabilization circuit that compares the power in a selected pair of R and P lines. A switching circuit connected into the stabilization circuit causes the laser's operating point to be switched within a short interval wherein four different pairs of R/P lines can be output within about 100 ms.

9 Claims, 5 Drawing Figures

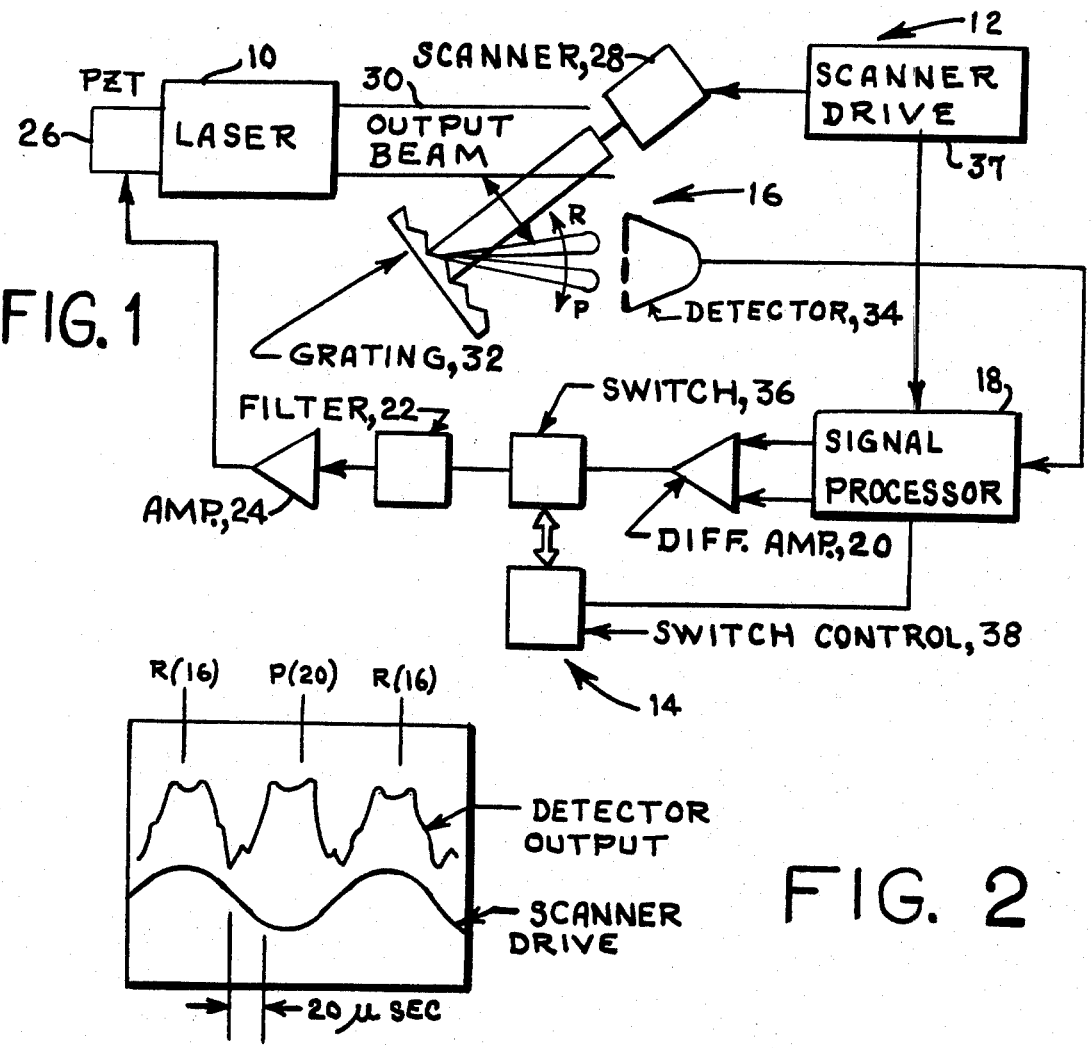
FIG. 1
FIG. 2
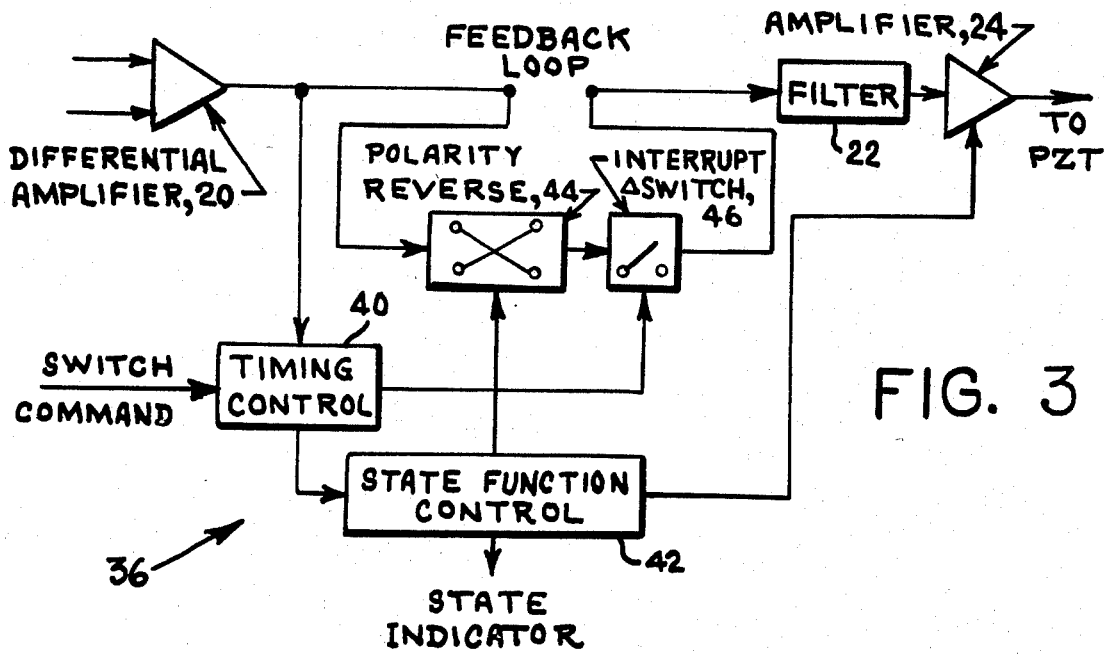
FIG. 3

$CO_2$ LASER STABILIZATION AND SWITCHING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a laser control apparatus and more particularly to an apparatus used to stabilize and to switch a $CO_2$ laser between a plurality of different R/P line pairs.

A use of a stabilization and switching circuit is mentioned briefly in an article by C. W. Gillard et al., *Absolute Distance Interferometry*, Optical Engineering, January/February 81, Vol. 20, No. 1, pages 129 to 134. The need for such a circuit was created because a two-color laser had to operate simultaneously on several R and P line wavelength sets. The absolute distance sensor mentioned in the above article using this type of circuit is composed of a $CO_2$ laser, two frequency driven Bragg cells, a synthetic Michelson interferometer, and a pair of detectors that detect the R and P line beams. The two-color laser of the above sensor is capable of stabilizing and operating simultaneously on any of four sets of two-color pairs, and of switching through the various color pairs by means of a piezoelectric mirror drive and control subsystem.

The piezoelectric mirror drive causes the two-color laser to shift operating points. An R/P differential power detector receiving a portion of the two-color laser energy outputs a signal to control electronics that adjust the piezoelectric mirror drive according to stabilization and switching requirements.

SUMMARY OF THE INVENTION

The present invention is directed toward providing electronic circuits needed to operate a multi-color laser. The multi-color laser is actively stabilized in any of four different R/P line pairs in the $CO_2$ 10.4 μm band by selective switching. The multi-color laser may be switched through the four line pairs in about 100 ms.

The laser stabilization and switching circuit operates on a multi-color $CO_2$ laser having desired characteristics to be detailed hereinafter and is driven by a piezoelectric mirror drive to stabilize and to switch the laser's operating point. The laser outputs a carrier beam with an R and P line pair therein which is partially intercepted by a scanning mirror that causes a portion of the carrier beam to be reflected to a diffracting grating which separates out the R and P line to form two separate beams. The R and P beams are scanned across a detector whose output is input to a signal processor that outputs a pair of signals related to the amplitude of the R and P beams maxima. A differential amplifier takes these signals and produces an output that is filtered, amplified and feedback to the piezoelectric mirror drive to insure correct stabilization. A switching circuit in the stabilization circuit causes the laser to switch from one pair of R/P lines to another pair based on a switch command from a computer.

It is therefore an object of this invention to provide for a multi-color laser stabilization and switching circuit.

It is another object of the present invention to provide for a laser stabilization and switching circuit that can switch between four line pairs within 100 milliseconds in a given sequence.

These and many other objects and advantages of the present invention will be readily apparent to one skilled in the pertinent art from the following detailed description of a preferred embodiment of the invention and related drawings.

BRIEF DESCRIPTION OF THE DRAWINGS

FIG. 1 is a schematic drawing of the laser stabilization and switching circuit of this invention;

FIG. 2 illustrates the output of the detector of the laser stabilization and switching circuit of FIG. 1;

FIG. 3 is a schematic drawing of the switching circuit of this invention;

DETAILED DESCRIPTION OF THE PREFERRED EMBODIMENT

Figure 4:
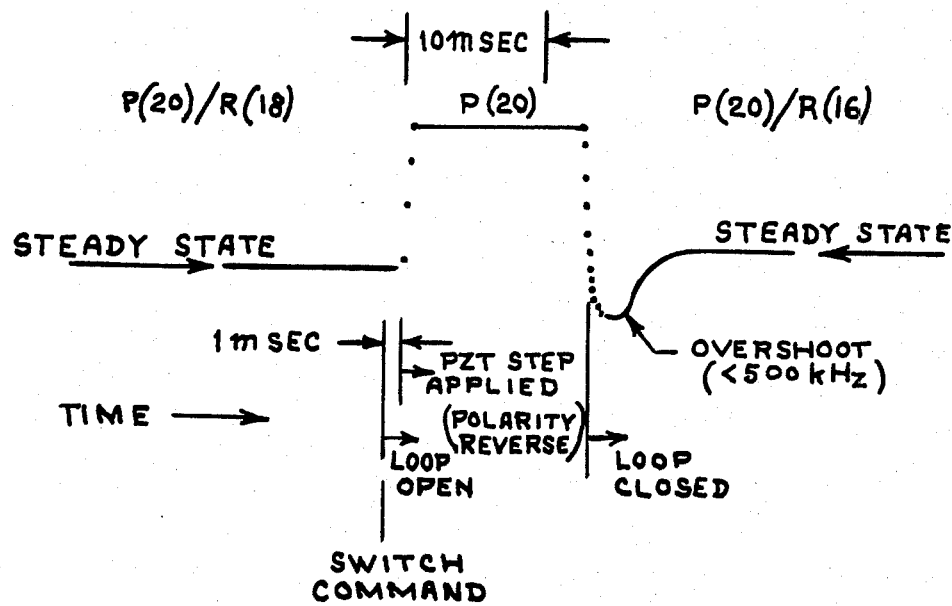
FIG. 4 illustrates the differential amplifier output during a typical switching period.

A $CO_2$ laser is actively stabilized in any of four different R/P line pairs in the 10.4 μm band. The laser is caused to rapidly switch between R/P pairs while maintaining a frequency stability of $1:10^{10}$, 5 Hz and above, and $1:10^8$, 0–5 Hz. The laser can be switched through the four line pairs in about 100 milliseconds.

Referring to FIG. 1, a conventional $CO_2$ laser 10 having a controllable length sweep is able to produce a desired sequence of rotational lines or "colors". A five color sequence has the form $$P(x) \; R(y) \begin{pmatrix} P(x+2) \\ P(x-2) \end{pmatrix} \; R(y+2) \begin{pmatrix} P(x+4) \\ P(x-4) \end{pmatrix} \tag{1}$$

where x and y are numbers such as 18, 20, etc. During such length tuning, frequency intervals of a few MHz wide appear in which simultaneous oscillations occur on adjacent R/P line pairs. These intervals arise because of independent gain pumping and collisional cross saturation between line pairs. In sequence (1) the adjacent pair is always composed of an R line and a P line. Active laser frequency stabilization may be applied at these "two color" operating points using a power balance between the line pair for the optical frequency discriminant. Thus, a laser which exhibits a sequence of rotational lines such as sequence (1) and which has an appropriate feedback frequency control can be operated in any of four different R/P line pairs in a steady state. A certain degree of frequency stability is obtainable at each operating point depending upon the fidelity of the power balance discriminant and the practical constraints which appear in the feedback loop. Furthermore, the laser can be caused to "leap" or switch between R/P stablized operating points through use of appropriate controls in the feedback circuit. This kind of laser operation finds application in multiple wavelength interferometry in which certain long "synthetic" wavelengths are employed to count the total number of 10 μm wavelengths in the measurement leg of the interferometer. A detailed explanation of such use is provided hereinafter. The absolute distance sensor utilizes a laser with the sequence $$P(22) \; R(18) \; P(20) \; R(16) \; P(18) \tag{2}$$

but other sequences, including those like (1) with R⇌P would also be applicable. In the absolute distance sensor scheme, the interferometer is illuminated by each R/P pair in rapid succession and in the given order. The absolute distance sensor "interferometer" does not produce fringes in the usual sense, but rather the phase at a convenient heterodyne frequency is measured alternately for each of two beams directed at retroreflectors, one designated "target," the other "reference." The phases are then subtracted, yielding a phase differential or "fractional fringe" indicative of the optical path difference between the target and reference lengths. This is done simultaneously for the R and P lines of each pair.

included. The tube of laser 10 is a Coherent Radiation Model 42L having an 80 cm active length and a 1 cm inner bore diameter. It utilizes flowing gas with a nominal mixture of 4.5: 13.5:82 $CO_2$:$N_2$:He, a flow rate of 0.2 l/min and pressure of 23 torr. Aproximately 20 watts $TEM_{oo}$ output is obtained at the flat output mirror. Coolant water, circulated through a closed cycle, temperature controlled bath is used to clamp the laser structure thermally and to cool the dc plasma discharge. Only a modest attempt was made to stabilize the cavity structure against vibration, etc., thus, the free running laser exhibits an FM noise spectrum which in typical fashion falls off inversely with frequency, and has several spectral peaks corresponding to structural reso-

TABLE I

```
                               mm   408.3
                               MHz  734.3
                              /            \
                 mm   22.0858                20.9523
                 MHz  13574.0                14308.3
                /            \              /         \
       μm  5598.47            7499.50                   5522.74
       MHz 53549.0            39975.0                   54283.3
      /           \          /         \              /         \
  μm 366.1898       343.7082              328.6461              310.1875
  MHz 818680.6      872229.6              912204.6              966487.9
 /         \      /         \           /         \           /         \
μm 10.571037    10.274438      10.591035             10.260381            10.611385
MHz 28359800.0  29178580.4     28306251.0            2918455.6            28251967.7
    P(18)         R(16)          P(20)                 R(18)                P(22)
```

Table I on the previous page illustrates how the four basic wavelength pairs generated by the laser 10 may be combined to provide the long synthetic wavelengths. These in turn, provide a means to determine the exact number of 10 μm wavelengths in the optical path difference. This is accomplished by measuring the optical path difference for each synthetic wavelength (obtain number of wavelengths plus the fractional fringe, beginning with the longest) with sufficient accuracy that a handover to the next shorter wavelength can be accurately done. The process is repeated until the 10 μm wavelength number and fractional fringe are obtained.

The degree of laser frequency stability obtainable determines the maximum usable range of the absolute distance sensor (wavelength handover and calibration accuracy). The speed at which the laser can be cycled through the four R/P pairs is related to the tolerance of the sensor to micro motions which may occur during the measurement process. Thus, important chracteristics of laser 10, in addition to producing sequence (1), are: (a) to exhibit a high degree of frequency stability (the absolute distance sensor requires an upper bound on the frequency excursion of 700/L kHz for handover, where L is the measured range in meters), and (b) to be switched rapidly through the four R/P pairs, reaching steady state at each pair long enough to obtain the required fringe date. As presently configured, the absolute distance sensor takes about 50 ms to get the fringe data in each steady state.

Laser 10 has a 10 m radius mirror, not shown, and a flat separated by approximately 1 m from the optical cavity. A thin wire polarizer and a $TEM_{oo}$ aperture are nances. Typical laser frequency excursions may be ~50 kHz at frequencies below 100 Hz (excluding low frequency drift) falling to 10 kHz or less at frequencies from 100 Hz−1 kHz.

As mentioned above, the purpose of a stabilization circuit 12 is to lock laser 10 into simultaneous oscillation on any one of four R/P line pairs. This is accomplished by equalizing the power content of the R line and the P line within the frequency interval of simultaneous oscillation. Stabilization circuit 12 includes a detection apparatus 16, a signal processor 18, a differential amplifier 20, a filter 22, an amplifier 24, and a piezoelectric (PZT) laser frequency control 26. A scanner 28 of detection apparatus 16 intercepts part of a laser carrier beam 30 and scans it via a grating 32 past a detector 34. The resulting double beam scanning produces a temporal separation of the R/P signals in the detector output. This output is shown in FIG. 2. The scanner 28/grating 32/detector 34 positions are so adjusted that the P line beam maximum has just passed before one scanner extremum and likewise for the R line beam maximum. The detector output is then processed using timing signals from a scanner drive 37 by signal processor 18. The resulting voltages appear at the input to differential amplifier 20. The output from differential amplifier 20, proportional to the power difference between the R/P lines, is filtered, amplified, and applied as negative feedback to frequency control 26.

The degree of stabilization achieved under closed loop conditions is determined by two methods. The first method utilizes the differential amplifier output converted into equivalent frequency modulation. The second method involves observation of the frequency modulation on the beat between two nearly identical lasers, both stabilized using this technique. The first method indicates how well stabilization circuit 12 operates; combining the first and second methods reveals the fidelity of the optical frequency discriminant. One source of discriminant error may be small amounts of light back reflected into the gain interaction region. Errors caused by back reflections are readily observed unless special care is taken so that backscatter from detectors, optics, etc., placed in the laser output beam falls below the sensitivity level of stabilization circuit 12. Stray reflections from objects inside the laser cavity can also cause such difficulty in principle, and it is found that the discriminant errors are very sensitive to slight motions of the various laser components. Aside from stray reflections, it is also likely that slight movement of the laser components can cause differential losses or gains to appear for the R/P pair. These differential effects should tend toward second order, but may nonetheless be of sufficient magnitude to cause difficulty. Errors such as these are observed to cause frequency deviations in the hundred of kHz range. It is also found that errors appear with different gas mixtures. Quantitative estimation of this effect with departure from nominal constituent ratios or with presence of contaminants has not yet been made. Considerable pressure sensitivity is also apparent. The magnitude of the error here varies somewhat depending upon which line pair is observed, but can be as large as 1 MHz/torr. On the positive side, for a given gas mixture, pressure, and proper thermal clamp laser 10 operates indefinitely under closed loop conditions, offering frequency stability for several hours at a time.

In order to cause laser 10 to switch operating points, a switching circuit 14 having a switch 36 and a switch control 38 is connected into stabilization circuit 12 to cooperate therewith. Switch control 38 issues switch commands to switch 36. Switch control 38 can be computer programmed to cause the proper sequence of switching in laser 10.

As mentioned above, once stabilization circuit 12 is applied to laser 10 which exhibits line sequence (1), it is possible to obtain stablized operation of any of the four R/P line pairs. The operating points for the four occur at different PZT voltages (cavity lengths) and the feedback polarity is reversed between adjacent pairs. Thus, for automatic switching between line pairs, switch control circuit 38 is used in conjunction with stabilization circuit 12 to implement the following sequence upon command: (1) open stabilization circuit 12, (2) apply a step voltage to PZT frequency control circuit 26 to shove the laser frequency towards the next stabilized operating point (3) reverse stabilization circuit 12 polarity, and (4) reenable stabilization circuit 12 to "catch" the next stablizhed operating point. A functional block diagram is shown in FIG. 3 of the circuit to perform these tasks.

In order to implement the sequence of switching commands, referring to FIG. 3, a timing control circuit 40 in response to a switch command from switch control 38 and to a given voltage output from differential amplifier 20 outputs a signal to an interrupt switch 46 and a state function control circuit 42. State function control circuit 46 outputs a given voltage to amplifier 24 to start changing the operating point and also causes a polarity reverse circuit 44 to change to catch the next operating point when interrupt switch 46 changes to enable by timing control circuit 40.

Figure 5:
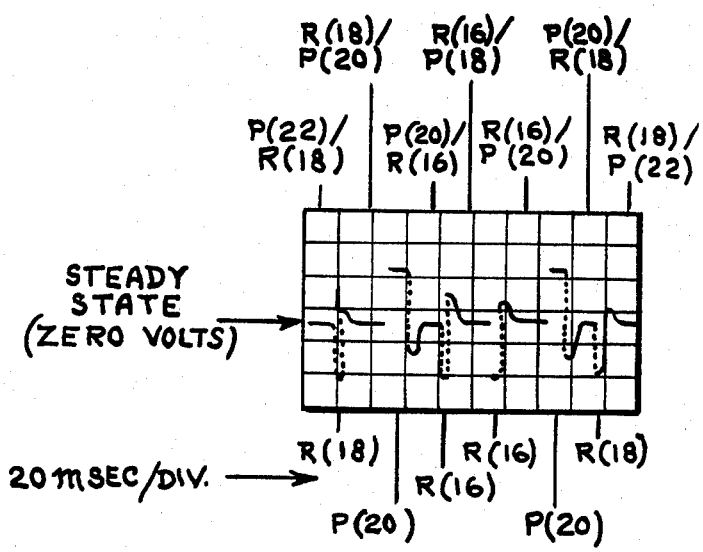
FIG. 5 illustrates the round trip switching sequence through the four color pairs of the $CO_2$ laser.

FIG. 4 illustrates the particulars of a typical switching sequence. The trace is the output voltage from differential amplifier 20 following processing of the scanner detector signals shown in FIG. 1. The dots represent data updates from scanner 28/detector 34 operating at 8 kHz. As indicated in FIG. 4, 1 ms after the loop opens a step voltage is applied to PZT frequency control circuit 26 and responds according to its RC time constant forcing the laser frequency to pass across line center. Differential amplifier 20 saturates as this occurs. It takes about 15 ms to pass across the P(20) line center shown. This transit time can be varied by adjusting the magnitude of the PZT voltage step. A given step results in faster transit of the lower gain lines. Stabilization circuit 12 is reactivated with opposite polarity as the differential amplifier output passes through zero at the two color operating point on the far side of line center. There is an overshoot as shown, with magnitude and time characteristics which depend upon stabilization circuit 12 response and the magnitude of the step voltage applied to PZT frequency control circuit 26. In a typical operation the peak overshoot is less than 500 kHz and the steady state is reached in less than 15 ms. Thus, as indicated, the entire switching operation is accomplished in less than 30 ms. FIG. 5 shows the same differential amplifier output when the laser is cycled round-trip through the sequence (2), beginning and ending with the P(22)/R(18) pair. The R line center crossings are negative and the P(20) line center crossings are positive. Note the differences in travel time and overshoot between the R and P lines. This pattern was obtained through separate adjustment of the three different PZT step voltages applied during the switching sequence. In this instance, the one way switching time through sequence is 100 ms, but this of course can vary depending upon the desired times spent in the steady states.

Clearly, many modifications and variations of the present invention are possible in light of the above teachings and it is therefore understood, that within the inventive scope of the inventive concept, the invention may be practiced otherwise than specifically claimed.

What is claimed is:

1. A laser stabilization and switching circuit comprising:

a laser for outputting a radiant energy carrier beam having therein a plurality of lines;

scanning means for extracting a portion of said carrier beam, said portion forming a detector beam that is reciprocally rotated by said scanning means;

detecting means for receiving said detector beam, said detecting means separating said detector beam having said plurality of lines therein into separate line beams, said detecting means outputting a power signal from each of said line beams;

a signal processor for outputting a plurality of line beam signals in parallel, said signal processor receiving said power signals and a scanning signal from said scanning means, the difference between each line beam signal indicating a difference in power between each of said plurality of lines in said radiant energy carrier beam from said laser for purposes of negative feedback control;

a differential amplifier, said differential amplifier receiving said plurality of line beam signals from said signal processor and outputting a feedback correction signal;

switching means for causing said laser to change operating points, said switching means receiving said feedback correction signal from said differential amplifier, said switching means outputting a stabilize/switch signal;

filter means for removing undesired frequencies from said stabilize/switch signal and outputting a filtered signal;

amplifying means for receiving said filtered signal and outputting an amplified signal; and means for changing the operating point of said laser, said means for changing receiving said amplified signal from said amplifying means whereby said laser switches operating points in a predetermined manner and outputs said carrier beam having a different plurality of lines therein.

2. A laser stabilization and switching circuit as defined in claim 1 wherein said laser is a $CO_2$ laser.

3. A laser stabilization and switching circuit as defined in claim 1 wherein said radiant energy carrier beam has a pair of R and P lines therein.

4. A laser stabilization and switching circuit as defined in claim 1 wherein said switching means includes a switch circuit and a switch control circuit.

5. A laser stabilization and switching circuit as defined in claim 4 wherein said switch circuit includes:

an interrupt circuit that open circuits a feedback loop to said means for changing the operating point, said interrupt circuit initiating a switch to said different plurality of lines;

a timing control circuit, said timing control circuit receiving a switch command from said switch control, and said feedback correction signal from said differential amplifier and outputting a switch signal to said interrupt switch circuit and a step signal to cause said laser to change to a different operating point;

a state function control circuit, said state function control circuit receiving said step signal from said timing control and outputting a step voltage signal to said amplifier; and a polarity reverse circuit that changes the polarity of said feedback correction signal from said differential amplifier, said polarity reverse circuit receiving said feedback correction signal from said differential amplifier and said step voltage signal from said state function control circuit.

6. A laser stabilization and switching circuit as defined in claim 5 wherein said laser is a $CO_2$ laser.

7. A laser stabilization and switching circuit as defined in claim 6 wherein said radiant energy carrier beam has a pair of R and P lines therein.

8. A laser stabilization and switching circuit as defined in claim 7 wherein said laser is able to switch between four pairs of R/P lines within 100 milliseconds.

9. A method of changing the operating point of a laser so that a selective plurality of lines are output in a radiant energy carrier beam of said laser, said steps comprising:

equalizing the amount of energy in different line beams to stabilize said laser operation, said laser outputting said carrier beam having different lines therein, said equalizing provided by a stabilization circuit to a laser frequency control circuit; opening said stabilization circuit to said laser frequency control circuit;

applying a step voltage to said laser frequency control circuit to shift said laser operating point towards a next stabilized operating point;

reversing a polarity in said stabilization circuit; and closing said stabilization circuit to catch said next stablized operating point.

* * * * *